Patented Oct. 6, 1931

1,826,621

UNITED STATES PATENT OFFICE

ELLIS A. LLOYD AND VICTOR P. GERSHON, OF NEW YORK, N. Y., ASSIGNORS TO WILLIAM M. GROSVENOR, OF NEW YORK, N. Y.

METHOD OF MAKING ANTHRAQUINONE AND LIKE PRODUCTS

No Drawing. Application filed September 13, 1920. Serial No. 409,811.

Our invention relates to improvements in methods of making anthraquinone and like products. More particularly our invention relates to the treatment of phthalic anhydride its homologues or its derivatives such as chlor-phthalic anhydride, with benzol, its derivatives or homologues such as toluol, and anhydrous aluminum chloride or other chlorides of polyvalent metals approaching the metalloid character, to produce anthraquinone or its corresponding homologues or derivatives. The main object of the invention is to provide a process of this character which may be cheaply and efficiently carried out with the production of valuable by-products and the utilization over again of certain reagents. Further and more specific objects, features and advantages will more clearly appear from the detail description given below.

As an example of a preferred embodiment of our process for making anthraquinone, we put 350 lbs. of benzol in a suitable kettle or still provided with a stirrer and add thereto 180 lbs. of anhydrous aluminum chloride, then 100 lbs. of phthalic anhydride are added thereto and the batch heated gradually as by a water jacket to between 70° and 80° C. with continual stirring. This treatment is kept up until the evolution of HCl gas practically ceases which is generally in about eight hours. The still is provided with a reflux condenser which returns volatilized benzol to the still while the HCl gas which is distilled off during the operation is permitted to pass out and is preferably absorbed in aniline to form aniline hydrochloride. The above treatment causes a reaction between the benzol and phthalic anhydride and aluminum chloride forming benzoyl benzoic acid aluminum chloride. That is, the aluminum chloride seems to be actually chemically combined with the benzoyl benzoic acid in molecular proportions.

When the reaction is completed as evidenced by the substantial ceasing of HCl evolution, the reflux condenser may be disconnected and a portion of the benzol distilled off and condensed for reuse. Or instead, 285 lbs. of sulphuric acid of about 70% strength or less may be added direct to the charge before distilling out any benzol or after some has been distilled out as above. During the addition of this sulphuric acid the heat of reaction serves to aid in distilling out the benzol remaining. The addition of this acid converts the benzoyl benzoic acid aluminum chloride into aluminum benzoyl benzoate and aluminum sulphate and hydrochloric acid, and converts the aluminum benzoyl benzoate into benzoyl benzoic acid and aluminum sulphate. Heat is applied if necessary to expel any remaining benzol which is condensed and recovered for reuse in the process. During the addition of this sulphuric acid and this benzol distillation, some hydrochloric acid will be given off which may be separated from the benzol by condensing the benzol separately or absorbing it in suitable hydrocarbon and the hydrochloric acid is run into concentrated sulphuric acid to remove the water therefrom after which the hydrochloric acid is absorbed in aniline to form aniline hydrochloride. We find that hydrochloric acid produced in this way is especially pure and capable of producing especially pure aniline hydrochloride or similar organic hydrochlorides in pure form. The weakened sulphuric acid produced may be used to treat the next batch as above.

In the still there now remains a concentrated solution of aluminum sulphate together with molten benzoyl benzoic acid and also some hydrochloric acid. After first cooling the contents of the still we add thereto about 900 lbs. of oleum of about 20% strength and maintain the cooling action while adding the oleum. The weight and percentage of oleum should be figured so as to leave sulphuric acid of not more than about 98% strength. This addition of oleum drives off the remainder of the HCl which may be absorbed in aniline or other organic compound to produce valuable by-products. The addition of oleum also dissolves the benzoyl benzoic acid and partially dissolves the aluminum sulphate. The batch is then heated with the concentrated sulphuric acid for about two or three hours to about 150° C. until substantially all the benzoyl benzoic acid is dehydrated and condensed to anthraquinone, which remains dissolved in the sulphuric acid. Thus by dehydrating as used here and in the appended claims we mean the removal of water of constitution from the organic product. The batch is then drowned in at least an equal volume of water whereupon the anthraquinone precipitates out and is separated from the hot liquor by filtration and is purified in any well-known or suitable manner. The liquor containing sulphuric acid and aluminum sulphate is neutralized by adding sufficient slaked lime or calcium carbonate to neutralize the free acid. The calcium sulphate is filtered off and the filtrate containing aluminum sulphate is evaporated down to such a degree that it contains a little more than 18 molecules of water to one molecule of aluminum sulphate and then is allowed to cool whereupon crude aluminum sulphate crystalizes out. If purer aluminum sulphate is desired this crude product may be suitably purified or instead the aluminum sulphate may be decomposed with sodium carbonate or otherwise, and pure aluminum salts made from the hydrate produced.

From the above it will be seen that we are enabled to carry the reactions through to a final production of anthraquinone without separating the benzoyl benzoic acid from the aluminum salt. That is, the benzoyl benzoic acid and anthraquinone are made in the same vessel without separating the benzoyl benzoic acid from the aluminum salts before transforming it into anthraquinone.

Instead of using sulphuric acid to decompose the benzoyl benzoic acid aluminum chloride, we may use hydrochloric acid of commercial strength to decompose the same forming benzoyl benzoic acid and $Al_2Cl_6$. Likewise many other acids may be used for this decomposition as will be readily understood by those skilled in the art but we prefer to use sulphuric acid because of the more valuable by-products formed thereby and because it may be used in the removal of water from the hydrochloric acid produced in the process. It will also be readily understood by those skilled in the art that various advantages of the process may be obtained by substituting for the benzol its derivatives or homologues, such as toluol and by substituting for the phthalic anhydride, its homologues or derivatives, such as chlor-phthalic anhydride and also by substituting for the aluminum chloride other anhydrous chlorides of polyvalent metals approaching the metalloid character such as ferric chloride with the result that homologues or derivatives of anthraquinone will be formed according to the particular reagents used.

We find that it is important to use substantially sufficient of the metal chloride to unite in molecular proportions with the benzoyl benzoic acid or otherwise the phthalic anhydride is not substantially completely converted and good yields are not obtained. Likewise we find that by decomposing the organic aluminum chloride compound with acid and particularly with sulphuric acid instead of decomposing the same with alkalis, the process is considerably shortened and more desirable and valuable by-products are obtained. For example in the specific illustration given the salt aluminum sulphate is formed, instead of aluminum hydrate, which is more easily separated out and more desirable to obtain than the aluminum hydrate.

While we have described our improvements with respect to a preferred form thereof and pointed out certain modifications which may be made, it will be understood that many other changes and modifications may be made without departing from the spirit and scope of the invention in its broader aspects.

What we claim as new and desire to secure by Letters Patent is:

1. The process which consists in decomposing the aluminum chloride addition product of ortho benzoyl benzoic acid, its monomethyl or monochlor derivatives, with sulphuric acid to free the organic compound from the aluminum chloride and to remove water of constitution from the organic compound to produce anthraquinone, its monomethyl or monochlor derivatives without removal therefrom of the aluminum sulphate produced.

2. The process which consists in decomposing the aluminum chloride addition product of ortho benzoyl benzoic acid, its monomethyl or monochlor derivatives, with sulphuric acid to free the organic compound from the aluminum chloride, and then adding oleum to remove water of constitution from the organic compound to produce anthraquinone, its monomethyl or monochlor derivatives.

3. The process which consists in decomposing the aluminum chloride, addition product of ortho benzoyl benzoic acid, its monomethyl or monochlor derivatives, with sulphuric acid to free the organic compound from the aluminum chloride, and then adding oleum to remove water of constitution from the organic compound to produce annthraquinone, its monomethyl or monochlor derivatives, without removal of the aluminum sulphate produced.

4. The process which consists in decomposing the metal chloride addition product of ortho-benzoyl benzoic acid, its monomethyl or monochlor derivatives, with sulphuric acid to free the organic compound from the metal chloride, and to remove water of constitution from the organic compound to produce anthraquinone, its monomethyl or monochlor derivatives, without removal therefrom of the metal sulphate produced.

5. The process which consists in decomposing the metal chloride addition product of ortho-benzoyl benzoic acid, its monomethyl or monochlor derivatives with sulphuric acid to free the organic compound from the metal chloride, and then adding oleum to remove water of constitution from the organic compound to produce anthraquinone, its monomethyl or monochlor derivatives.

6. The process which consists in decomposing the metal chloride addition product of ortho-benzoyl benzoic acid, its monomethyl or or monochlor derivatives with sulphuric acid to free the organic compound from the metal chloride, and then adding oleum to remove water of constitution from the organic compound to produce anthraquinone, its monomethyl or monochlor derivatives, without removal therefrom of the metal sulphate produced.

7. The process which consists in decomposing the aluminum chloride addition product of ortho-benzoyl benzoic acid, its monomethyl derivative or the monochlor derivative of either, with sulphuric acid to free the organic compound from the aluminum chloride and to remove water of constitution from the organic compound to produce anthraquinone, its monomethyl or monochlor derivatives without removal therefrom of the aluminum sulphate produced.

8. The process of making an anthraquinone body which comprises heating an o-aroylbenzoic-aluminum chloride compound with strong sulfuric acid.

9. The process of making an anthraquinone body which comprises heating an o-bezoylbenzoic-aluminum chloride compound with strong sudfuric acid.

10. The process of making an anthraquinone body which comprises heating o-benzoylbenzoic-aluminum chloride compound with strong sulfuric acid.

Signed by the said ELLIS A. LLOYD at New York, in the county of New York, and State of New York, this 13th day of August, 1920.

ELLIS A. LLOYD.

Signed by the said VICTOR P. GERSHON at New York, in the county of New York, State of New York, this 13th day of August, 1920.

VICTOR P. GERSHON.